Feb. 11, 1941.    F. L. LAWRENCE    2,231,411
TRANSMISSION CLUTCH
Filed Dec. 19, 1938    2 Sheets-Sheet 1

INVENTOR.
FRANK LENDRUM LAWRENCE.

ATTORNEY.

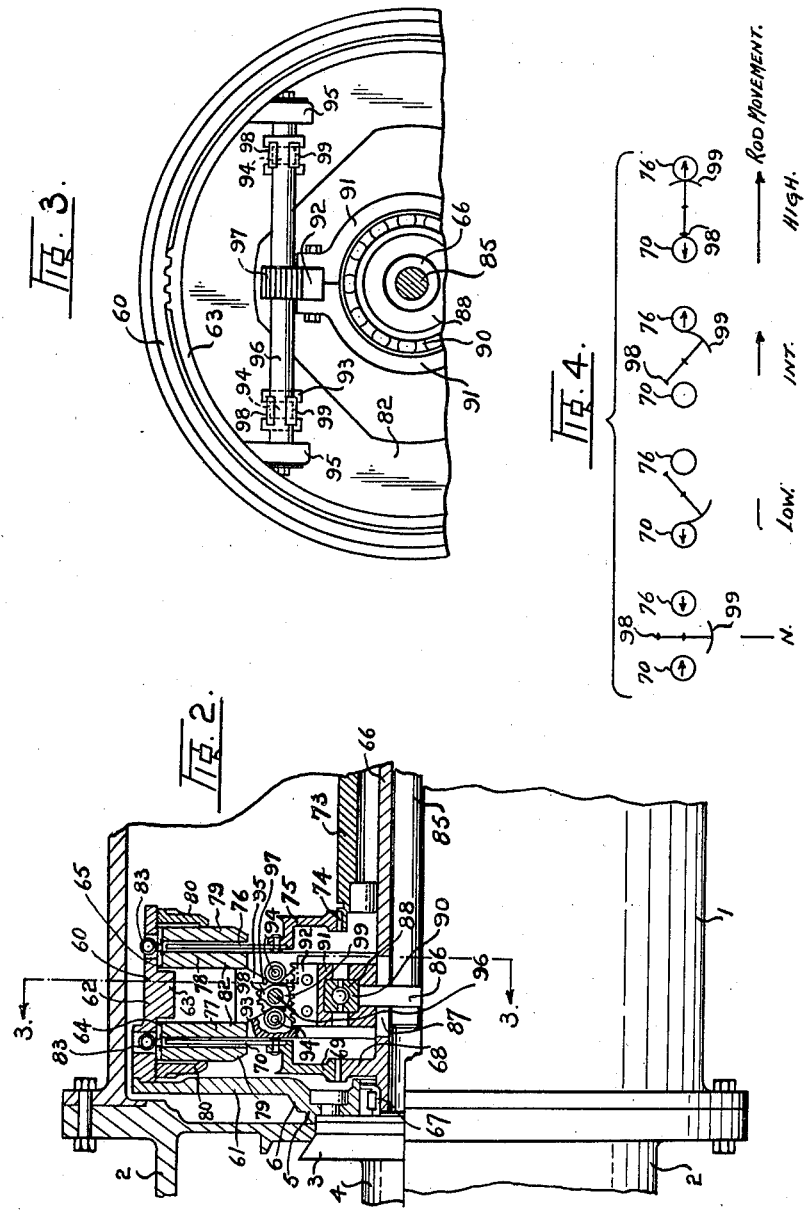

Patented Feb. 11, 1941

2,231,411

UNITED STATES PATENT OFFICE 2,231,411

TRANSMISSION CLUTCH

Frank Lendrum Lawrence, Vancouver, British Columbia, Canada

Application December 19, 1938, Serial No. 246,653

7 Claims. (Cl. 192—48)

My invention relates to improvements in transmission clutches which while capable of use for transmitting power at selective speeds from many drive to driven shafts is particularly adaptable for transmitting the drive between an internal combustion engine and a winding drum.

The objects of the invention are to provide means whereby instantaneous change may be made from one driven speed to another without shock either to the drive or driven shafts; to provide a flywheel structure which forms a housing for the transmission clutches, and to provide a control for said clutches which is operable in axial alignment with the drive shaft.

The invention consists of a transmission clutch including a pair of clutches concentrically mounted in a rotatable housing, a hollow shaft and a sleeve having a driven gear aligned with the housing and adapted to be selectively driven by the clutches, and means operable axially of said shafts for controlling the clutches, as will be more fully described in the following specification and shown in the accompanying drawings, in which:

Fig. 2 is a longitudinal sectional view of a modified form of clutch housing and clutch control.

Fig. 3 is a sectional view taken on the line 3—3 of Figure 2.

Fig. 4 is a diagrammatic view of the cam settings to engage the disc clutches of Figures 2 and 3.

In the drawings like characters of reference indicate corresponding parts in each figure.

Figure 1:
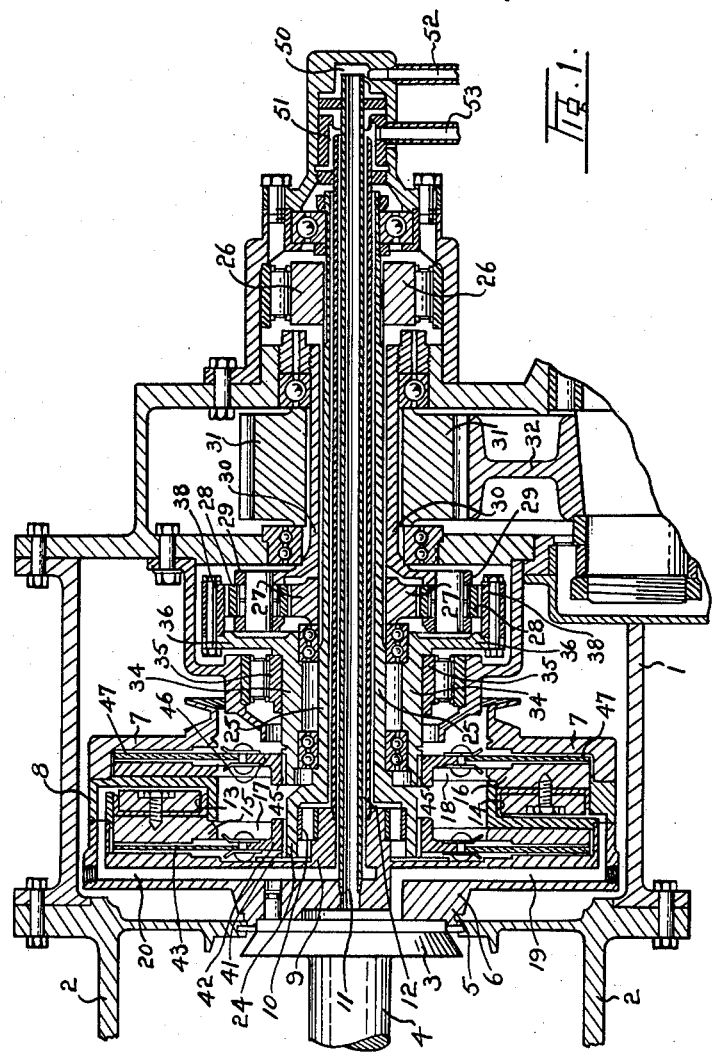
Fig. 1 is a longitudinal sectional view of the invention.

The numeral 1 indicates generally the transmission casing shown as being attached to the crank case 2 of a suitable internal combustion engine, not shown. The numeral 3 indicates the flange coupling of the crank shaft 4 of said engine. Secured to the coupling 3 is a housing 5, which may constitute the engine flywheel and consists of a flange 6, an annular flange 7 and an annular spacer 8. The flange 6 is provided with an internal hub 9 which is fitted with a bearing 10 and is provided with an inner and an outer fluid pressure tube 11 and 12 respectively. The spacer 8 is provided with a plurality of circumferentially arranged recesses or cylinders 13 and 14, which are fitted with pistons 15 and 16 respectively. The pistons 15 are integral with a thrust plate 17 and the pistons 16 are integral with a thrust plate 18. The tube 11 communicates through a passage 19 with the pistons 16 to move the thrust plate 18 rearwards, and the tube 12 communicates through a passage 20 with the pistons 15 to move the thrust plate 17 forward towards the flange coupling 3.

Journalled upon the bearing 10 on the hub 9 of the flange 6 is the enlarged end 24 of a hollow shaft 25. This hollow shaft 25 is fitted adjacent its outer end with a one way brake 26 which permits said hollow shaft to rotate in one direction only. Secured intermediate the length of the hollow shaft 25 is a sun gear 27 in constant mesh with a set of planetary gears 28, which latter are rotatably supported from a flange 29 of a final drive sleeve 30. The final drive sleeve is fitted with a gear 31 which constitutes the "take off" from the transmission. The gear 32 which meshes with the take off gear 31 is incidental to the device to be driven and forms no part of the invention.

A carrier 34 is rotatably journalled upon the hollow shaft 25 and is fitted with one way brake 35, which permits said carrier to rotate in the same direction as the one way brake 26 and that direction only. The carrier 34 is provided with a flange 36 supporting at its outer periphery an internal ring gear 38 which is in mesh with the planetary gears 28.

The enlarged end 24 of the hollow shaft 25 is splined as at 41 to slidably receive the flange 42 of a disc clutch 43, which clutch is adapted to be engaged between the flange 6 and the thrust plate 17 supporting the pistons 15.

The carrier 34 is splined at its inner end as at 45 to slidably receive the flange 46 of a disc clutch 47, which clutch is adapted to be engaged between the flange 7 and the thrust plate 18 supporting the pistons 16.

The outer end of the housing 2 is divided into annular passages 50 and 51 which are suitably glanded and communicate respectively with the interior of the tubes 11 and 12. An inlet pipe 52 communicates with the passage 50 and the tube 11 and an inlet pipe 53 communicates with the passage 51 and the interior of the tube 12.

In the modification shown in Figures 2 and 3, the clutch housing is indicated by the numeral 60 and consists of a flange 61 secured to the crank shaft coupling 3 and having an annular rim 62 provided with an internal rib 63 and internal longitudinal splines 64 and 65. The hollow shaft 66 which corresponds to the hollow shaft 25 in Figure 1, is journalled in the flange 61 as at 67 and is provided with a splined enlargement 68 upon which is slidably fitted the flange 69 of a disc clutch 70.

The carrier 73 which corresponds to the carrier 34 of Figure 1, is provided with splines 74 upon which a flange 75 of a disc clutch 76 is slidably mounted. The disc clutches 70 and 76 are each adapted to be thrust by thrust plates 77 and 78 respectively against a splined non-rotating flange 79, which flange is adjustably held in endwise position by an externally threaded ring 80. Each of the thrust plates 77 and 78 consists of a flange 82 slidably engaging the splines 64 or 65 which is urged out of engagement with its disc clutch by peripherally mounted springs 83. The hollow shaft 66 is fitted with an endwise movable control rod 85 having a transverse pin 86 through its inner end which extends through a slot 87 in the hollow shaft and carries a hub 88 having sliding movement upon the shaft 66. A bearing 90 is carried upon the hub 88 and a split collar 91 is journalled upon the bearing, which supports a pair of longitudinally arranged toothed racks 92. Journalled in lugs 93 on the inner faces of the thrust plates 77 and 78 are pairs of rollers 94 and journalled between pairs of lugs 95, which extend inwardly from the rib 63 of the annular rim 62, are shafts 96. Each of the shafts is provided with a pinion 97 at its centre, which meshes with one of the toothed racks 92 and has adjacent each end a short and a long cam respectively numbered 98 and 99, which cams are selectively moved in response to the endwise movement of the rod 85 and the toothed racks 92.

The operation of the device as shown in Figure 1 is as follows:

With the housing 5 rotating, when fluid under pressure is admitted from the pipe 53 and through the tube 12 to the cylinders 13, the pistons 15 and their thrust plate are thrust forwardly to bind the disc clutch 43 against the flange 6, so that said disc clutch will through the splines 41 drive the hollow shaft 25 and its sun gear 27 at crank shaft or housing speed. Since no drive is now imparted to the housing through the disc clutch 47 the one way brake 35 will hold the carrier 34 against reverse rotation, together with the ring gear 38, so that the sun gear 27 will roll the planetary gears 28 around said ring gear and impart rotation to the final drive sleeve 30 and the take off gear 31 at the low speed of the transmission train.

When fluid pressure is admitted from the pipe 52 and through the tube 11 to the cylinders 14, the pistons 16 and their supporting thrust plate 18 are moved rearwardly, or to the right, thus binding the disc clutch 47 against the flange 7 of the housing 5. The disc clutch 18 through the splines 45 rotates the carrier 34 and its internal ring gear 38. At this time no drive will be imparted to the hollow shaft 25 and since the one way brake 26 prevents said shaft from rotating in a reverse direction to that of the housing 5, the sun gear 27 which it carries will remain stationary, so that the rotation of the ring gear 38 about the planetary gears 28 will cause said planetary gears to travel around the sun gear in the same direction as the housing. The planetary gears being carried by the flange of the final drive sleeve 30 must on rotation about the sun gear cause the take off gear 31 to rotate at the same speed as said planetary gears travel around their orbit. In the instance above described intermediate speed will result.

When fluid is admitted to both tubes 11 and 12 simultaneously and both clutch discs 43 and 47 are engaged, both one-way brakes 26 and 35 will be free wheeling and the hollow shaft 25 with its take off gear 31 and the carrier 34 with its ring gear 38 will be rotating in the same direction and at the same speed. Consequently the planetary gears 28 will not rotate about their own axes, but will serve to rotate the final drive sleeve 30 and the take off gear 31 at housing or high speed.

The operation of the clutch control as shown in Figures 2 and 3 is as follows:

The endwise movable rod 85 is shown in neutral position with both disc clutches disengaged and it will be obvious that the rod may be moved an equal distance in opposite directions, we will therefore assume for the purpose of description that the major movement is to be made to the right or away from the flange 4. To engage clutch 70, the rod 85 is moved to the left, swinging the shafts 96, see Figure 2, to the right to cause the long cam 99 to move the thrust plate 77 to the left and engage the clutch 70, see Figure 4. To engage the clutch 76, the rod is moved to the right of the neutral position, causing the long cam 99 to move the thrust plate 78 to engage the clutch 76 and leave the clutch 70 disengaged. When the rod 85 is moved still further to the right, the long cam 99 continues to hold the thrust plate 78 in engagement with its clutch 76 and the short cam 98 moves the thrust plate 77 to the left to engage the clutch 70 also.

What I claim as my invention is:

1. In a transmission, a clutch mechanism consisting of a rotatable housing adapted for connection to a drive shaft, said housing having a pair of spaced flanges, the first of said flanges having a bearing hub, a sleeve journaled upon the hub, a clutch member slidably mounted upon the sleeve and secured for rotation therewith, said clutch member being adapted to engage the first flange and be driven thereby, a second sleeve journaled upon the first sleeve, a second clutch member slidably mounted upon said sleeve and secured for rotation therewith, said second clutch member being adapted to engage the second flange to be driven thereby and means for selectively moving the clutch members into engagement with their respective flanges.

2. In a transmission, a clutch mechanism consisting of a rotatable housing adapted for connection to a drive shaft, said housing having a pair of spaced flanges, the first of said flanges having a bearing hub, a sleeve journalled upon the hub, a clutch member slidably mounted upon the sleeve and secured for rotation therewith, said clutch member being adapted to engage the first flange and be driven thereby, a second sleeve journaled upon the first sleeve, a second clutch member slidably mounted upon said sleeve and secured for rotation therewith, said second clutch member being adapted to engage the second flange to be driven thereby and means for selectively moving both the clutch members into engagement with their respective flanges.

3. In a transmission, a clutch mechanism consisting of a rotatable housing adapted for connection to a drive shaft, said housing having a pair of spaced flanges, the first of said flanges having a bearing hub, a sleeve journalled upon the hub, a clutch member slidably mounted upon the sleeve and secured for rotation therewith, a second sleeve journaled upon the first sleeve, a second clutch member slidably mounted upon said sleeve and secured for rotation therewith, and means carried by the housing adapted to selectively clamp the first clutch member to the first flange and the second clutch member to the second flange of the housing to drive either of the sleeves.

4. In a transmission, a clutch mechanism consisting of a rotatable housing adapted for connection to a drive shaft, said housing having a pair of spaced flanges, the first of said flanges having a bearing hub, a sleeve journaled upon the hub, a clutch member slidably mounted upon the sleeve and secured for rotation therewith, a second sleeve journaled upon the first sleeve, a second clutch member slidably mounted upon said sleeve and secured for rotation therewith, and means carried by the housing adapted to collectively clamp the first clutch member to the first flange and the second clutch member to the second flange of the housing to drive both sleeves simultaneously.

5. A clutch mechanism as claimed in claim 1 wherein the means for moving the clutch members into engagement with their respective flanges consists of a plurality of cams and a control rod extending through the drive shaft for rocking the cams.

6. A clutch mechanism as claimed in claim 1 wherein the means for moving the clutch members into engagement with their respective flanges consists of a pair of slidable thrust plates, a plurality of cams for engaging each thrust plate and a control rod extending through the drive shaft for rocking the cams.

7. A clutch mechanism as claimed in claim 1 wherein the means for moving the clutch members into engagement with their respective flanges consists of a pair of slidable thrust plates, a plurality of cams for engaging each thrust plate, pinions secured to the cams, a plurality of racks in mesh with the pinions and a control rod extending through the drive shaft for moving the racks to rock the cams.

FRANK LENDRUM LAWRENCE.